(12) United States Patent
Tseng et al.

(10) Patent No.: US 11,536,925 B2
(45) Date of Patent: Dec. 27, 2022

(54) CAMERA MODULE AND ELECTRONIC DEVICE

(71) Applicant: LARGAN DIGITAL CO., LTD., Taichung (TW)

(72) Inventors: Te-Sheng Tseng, Taichung (TW); Ming-Ta Chou, Taichung (TW); Wen-Hung Hsu, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 732 days.

(21) Appl. No.: 16/441,141

(22) Filed: Jun. 14, 2019

(65) Prior Publication Data

US 2020/0089083 A1 Mar. 19, 2020

(30) Foreign Application Priority Data

Sep. 17, 2018 (TW) ................................. 107132666

(51) Int. Cl.
*G03B 13/36* (2021.01)
*G02B 7/09* (2021.01)
*G02B 7/02* (2021.01)
*G03B 5/00* (2021.01)

(52) U.S. Cl.
CPC ............... *G02B 7/021* (2013.01); *G02B 7/09* (2013.01); *G03B 5/00* (2013.01); *G03B 13/36* (2013.01)

(58) Field of Classification Search
None
See application file for complete search history.

(56) References Cited

U.S. PATENT DOCUMENTS

| 7,545,591 | B1 * | 6/2009 | Tong | G02B 7/021 |
| | | | | 359/827 |
| 7,697,216 | B2 * | 4/2010 | Wada | G03B 3/10 |
| | | | | 359/821 |
| 8,199,421 | B2 * | 6/2012 | Lu | G02B 7/08 |
| | | | | 359/811 |

(Continued)

FOREIGN PATENT DOCUMENTS

| CN | 102338921 A | 2/2012 |
| CN | 104238063 A | 12/2014 |

(Continued)

OTHER PUBLICATIONS

English translation of First Office Action for application CN201811440964, dated Jan. 19, 2021 (Year: 2021).*

*Primary Examiner* — Leon W Rhodes, Jr.

(74) *Attorney, Agent, or Firm* — McClure, Qualey & Rodack, LLP

(57) ABSTRACT

A camera module includes a metal yoke, a holding base, a plastic barrel, a plurality of plastic lens elements, a leaf spring pair and a coil element. The holding base is connected to the metal yoke and defines an inner space. The holding base has a through hole which is corresponding to an opening of the metal yoke. The plastic barrel is movably disposed in the inner space. The plastic lens elements are disposed in the plastic barrel. The leaf spring pair includes two leaf springs which are located on a same plane and connected to the plastic barrel. The coil element surrounds an outer surface of the plastic barrel and electrically connected to the leaf spring pair, wherein two ends of the coil element is connected to the leaf springs by a thermal pressing method.

16 Claims, 16 Drawing Sheets

(56) References Cited

U.S. PATENT DOCUMENTS

| | | | | |
|---|---|---|---|---|
| 8,885,270 | B2 * | 11/2014 | Tanaka | G02B 13/0045 359/716 |
| 10,185,115 | B2 * | 1/2019 | Wang | G02B 7/023 |
| 10,534,154 | B2 * | 1/2020 | Hubert | H04N 5/2257 |

FOREIGN PATENT DOCUMENTS

| | | | | | |
|---|---|---|---|---|---|
| CN | 204807787 | U | * | 11/2015 | |
| CN | 105527691 | A | | 4/2016 | |
| CN | 107991752 | A | * | 5/2018 | G02B 7/09 |
| JP | 2011085682 | A | * | 4/2011 | |
| JP | 2013156496 | A | * | 8/2013 | G02B 7/028 |
| TW | 201203758 | A | * | 1/2012 | G02B 7/08 |
| TW | I393312 | B | | 4/2013 | |
| WO | WO-2016175210 | A1 | * | 11/2016 | G02B 7/04 |
| WO | WO-2018043132 | A1 | * | 3/2018 | G02B 7/04 |

* cited by examiner

CAMERA MODULE AND ELECTRONIC DEVICE

RELATED APPLICATIONS

This application claims priority to Taiwan Application Serial Number 107132666, filed Sep. 17, 2018, which is herein incorporated by reference.

BACKGROUND

Technical Field

The present disclosure relates to a camera module. More particularly, the present disclosure relates to a camera module with autofocus function applicable to portable electronic devices and having.

Description of Related Art

In recent years, portable electronic devices have developed rapidly. For example, intelligent electronic devices and tablets have been filled in the lives of modern people, and camera module mounted on portable electronic devices has also prospered. However, as technology advances, the quality requirements of camera modules are becoming higher and higher. Therefore, in addition to the improvement in optical design, the camera module needs to be improved in manufacturing precision.

In a camera module equipped with autofocus function, the configuring relationship and connecting method between components often affect the quality of the overall camera module, especially when the components are connected by high heat welding, the applied high heat tends to affect the state of other peripheral components, which causes the manufacturing yield of the camera module to be affected.

SUMMARY

According to an embodiment of the present disclosure, a camera module includes a metal yoke, a holding base, a plastic barrel, a plurality of plastic lens, a leaf spring pair, and a coil element. The metal yoke has an opening. The holding base is connected to the metal yoke and defines an inner space. The holding base has a through hole which is corresponding to the opening of the metal yoke. The plastic barrel is movably disposed in the inner space. The plastic lens elements are disposed in the plastic barrel. The leaf spring pair includes two leaf springs which are located on a same plane and connected to the plastic barrel, wherein each of the leaf springs includes at least two positioning holes for connecting to the plastic barrel. The coil element surrounds an outer surface of the plastic barrel and is electrically connected to the leaf spring pair, wherein one end of the coil element is connected between the at least two positioning holes of one of the leaf springs, and the other end of the coil element is connected between the at least two positioning holes of the other one of the leaf springs, and the coil element is connected to the leaf springs by a thermal pressing method.

According to another aspect of the present disclosure, an electronic device includes the camera module of the aforementioned aspect and an image sensor, wherein the image sensor is disposed on the image surface of the camera module.

According to an embodiment of the present disclosure, a camera module includes a metal yoke, a holding base, a plastic barrel, a plurality of plastic lens elements, a leaf spring pair, a metal plate pair and a coil element. The metal yoke has an opening. The holding base is connected to the metal yoke and defines an inner space, and the holding base has a through hole which is corresponding to the opening of the metal yoke. The plastic barrel is movably disposed in the inner space. The plastic lens elements are disposed in the plastic barrel. The leaf spring pair includes two leaf springs which are located on a same plane and connected to the plastic barrel. The metal plate pair includes two metal plates which are electrically connected to the leaf springs, respectively, wherein each of the metal plates includes at least two positioning holes for connecting to the plastic barrel. The coil element surrounds an outer surface of the plastic barrel and is electrically connected to the metal plate pair, wherein one end of the coil element is connected between the at least two positioning holes of one of the metal plates, and the other end of the coil element is connected between the at least two positioning holes of the other one of the metal plates, and the coil element is connected to the metal plates by a thermal pressing method.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
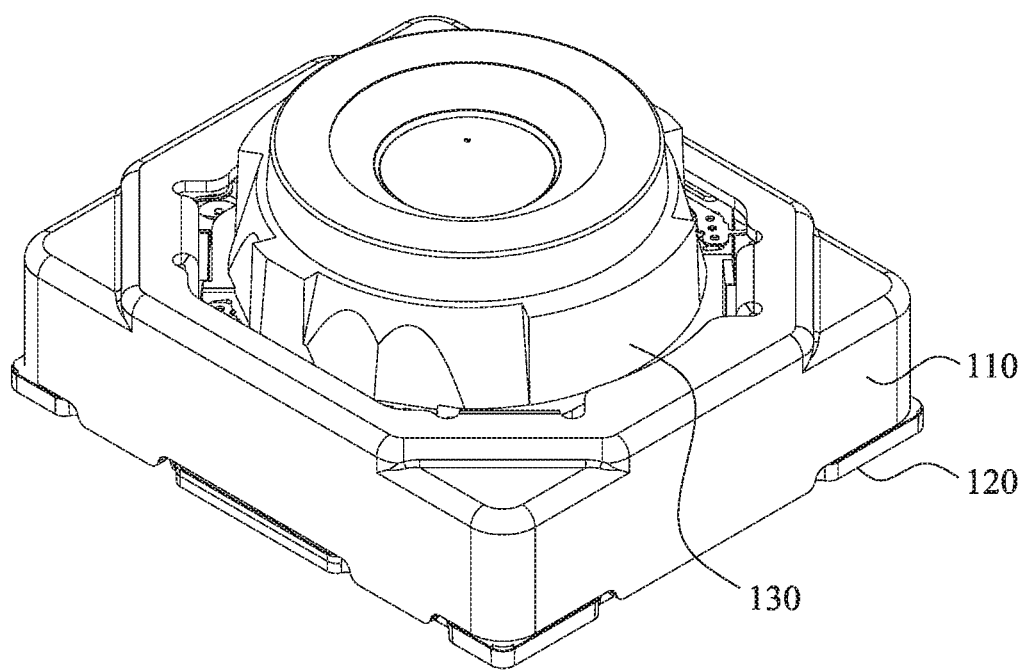
FIG. 1 is a schematic view of a camera module according to the 1st example of the present disclosure.

According to an embodiment of the present disclosure, a camera module includes a metal yoke, a holding base, a plastic barrel, a plurality of plastic lens, a leaf spring pair and a coil element. The metal yoke has an opening. The holding base is connected to the metal yoke and defines an inner space. The holding base has a through hole which is corresponding to the opening of the metal yoke. The plastic barrel is movably disposed in the inner space. The plastic lens elements are disposed in the plastic barrel. The leaf spring pair includes two leaf springs which are located on a same plane and connected to the plastic barrel, wherein each of the leaf springs includes at least two positioning holes for connecting to the plastic barrel. The coil element surrounds an outer surface of the plastic barrel and is electrically connected to the leaf spring pair, wherein one end of the coil element is connected between the at least two positioning holes of one of the leaf springs, and the other end of the coil element is connected between the at least two positioning holes of the other one of the leaf springs, and the coil element is connected to the leaf springs by a thermal pressing method. Compare to the conventional welding method, it is favorable for avoiding excessive and unnecessary thermal effects on the plastic barrel by utilizing the thermal pressing method to connect the coil element and the leaf springs. Further, it is favorable for avoiding the leaf springs from being deformed after the thermal pressing by connecting the coil element between the positioning holes of the leaf springs which would not affect the assembling of the leaf spring pair and the plastic barrel. Moreover, due to the arrangement of the integrated carrier (that is, the plastic barrel of the present disclosure serves as a lens barrel for accommodating the plastic lens elements and a carrier for driving the plastic lens elements to shift and focus) can greatly reduce the size of the entire camera module, the leaf spring pair is arranged closer to the plastic lens elements than the conventional arrangement, and it is favorable for avoiding the plastic lens from unnecessary thermal effects by utilizing the thermal pressing method. Therefore, the stability of the assembling can be maintained and the plastic lens elements can be prevented from the excess waste heat by connecting the coil element between the positioning holes, so as to achieve a more ideal compact camera module with autofocus function.

The at least one of the two leaf springs of the leaf spring pair can further include an inner fixing portion, at least one outer fixing portion and an elastic portion. The inner fixing portion is connected to the plastic barrel, and the positioning holes are disposed on the inner fixing portion. The outer fixing portion is connected to the holding base. The elastic portion is connected to the inner fixing portion and outer fixing portion. By designing the distinct regional structures on the leaf springs, the quality of the leaf spring pair can be easily detected and mastered by the naked eye during the manufacturing process, and the assembling success rate of the leaf spring pair and the plastic barrel can be increased.

The inner fixing portion can include a thickness reducing area, which is deposed between the positioning holes, and the aforementioned end of the coil element is connected to the thickness reducing area. Therefore, the thickness reducing area can be formed into a small block structure, which can increase the surface area of heat dissipation, and increase the heat dissipation efficiency of the partial area, so as to prevent the elastic portion of the leaf spring from unnecessary thermal effects. Furthermore, the thickness reducing area can include a crossed pattern. Therefore, the contact surface area of the coil element and the thickness reducing area can be increased after thermal pressing.

Furthermore, the inner fixing portion can include a flexible structure, which is disposed between the positioning holes. Therefore, when the thermal pressing operation is performed, the pressure applied to the inner fixing portion can be further buffered so as to reduce the bending deformation therefrom. Moreover, the flexible structure can be a strip hole. Therefore, the flexible structure can be made more easily, and the convenience of manufacturing the leaf spring can be maintained.

In the leaf spring pair, the elastic portion of the at least one leaf spring overlaps along a radial direction perpendicular to an optical axis. Therefore, the tilting of the plastic barrel would not occur easily during the focusing movement by lengthening the length of the elastic portion in the limited space.

In the leaf spring pair, the elastic portion of the at least one leaf spring and the inner fixing portion do not overlap along a radial direction perpendicular to the optical axis. Therefore, the elastic portion can be prevented from the effects of extra high temperature and high heat when the thermal pressing operation of the inner fixing portion is operated.

The plastic barrel can be a threadless structure. Therefore, the prior art carrier is not required, the additional assembling operation can be greatly reduced, the probability of assembling failure can be reduced, and assembling tolerances can be eliminated.

One end of the plastic barrel away from the holding base can be a circular-shaped, and the other end of the plastic barrel can be a polygonal-shaped. Therefore, the end with circular-shaped is favorable for the receiving-light opening of plastic barrel to maintain stable quality during the manufacturing process, and it is not easy to produce the appearance defects, such as burrs which is easily generated by the injection molding or shining by insufficient injection.

Moreover, the coil element surrounds the end of the plastic barrel being the polygonal-shaped. Therefore, it is favorable for assembling the coil element on the plastic barrel by machine automation.

According to another embodiment of the present disclosure, a camera module compared to the camera module according to the aforementioned embodiment can further include a metal plate pair. The metal plate pair includes two metal plates which are electrically connected to the leaf springs, respectively, wherein each of the metal plates includes at least two positioning holes for connecting to the plastic barrel. The coil element of the camera module surrounds an outer surface of the plastic barrel and is electrically connected to the metal plate pair, wherein one end of the coil element is connected between the positioning holes of one of the metal plates, and the other end of the coil element is connected between the positioning holes of the other one of the metal plates, and the coil element is connected to the metal plates by a thermal pressing method. By the arrangement of the metal plate pair, most of the residual heat generated by the thermal pressing operation can be absorbed by the metal plate pair, so that the area of the inner fixing portion of the leaf spring can be reduced, and the thermal effect on the elastic portion can be also reduced. Moreover, the thickness of the metal plate pair can be thicker than the thickness of the leaf spring, and can be used as a washer for the thermal pressing operation so as to prevent the leaf spring from being deformed by pressing.

At least one of the leaf springs of the leaf spring pair can include an inner fixing portion connected to the plastic barrel, wherein the inner fixing portion includes at least two positioning holes for connecting to the plastic barrel. Moreover, the inner fixing portion can further include a flexible structure disposed between the positioning holes. Therefore, the elastic structure can absorb the external force from the thermal pressing operation, and the leaf spring pair is prevented from bending deformation by pressing.

At least one of the leaf springs of the leaf spring pair can include an elastic portion connected to the inner fixing portion, wherein the elastic portion and the inner fixing portion do not overlap along a radial direction perpendicular to an optical axis. Therefore, the elastic portion can be prevented from the effects of extra high temperature and high heat when the thermal pressing operation of the inner fixing portion is operated.

Each of the metal plates can further include a notch structure for receiving the coil element. Therefore, the position of the coil element close to the metal plate pair can be preset to reduce the difficulty of thermal pressing operation.

An air gap is formed between the plastic barrel and the metal plate pair. Therefore, it is favorable for quickly eliminating the high temperature and high heat of the metal plate pair so as to avoid the plastic barrel receiving all the waste heat generated by the thermal pressing operation which would increase the risk of melting of the plastic barrel and affecting the plastic lens elements in the plastic barrel.

Each of the aforementioned features of the camera module can be utilized in various combinations for achieving the corresponding effects.

According to another embodiment of the present disclosure, an electronic device includes the aforementioned camera module and an image sensor, wherein the image sensor is disposed on an image surface of the camera module. Therefore, an electronic device with both image quality and assembling stability can be provided.

According to the above description of the present disclosure, the following specific examples are provided for further explanation.

1st Example

Figure 2:
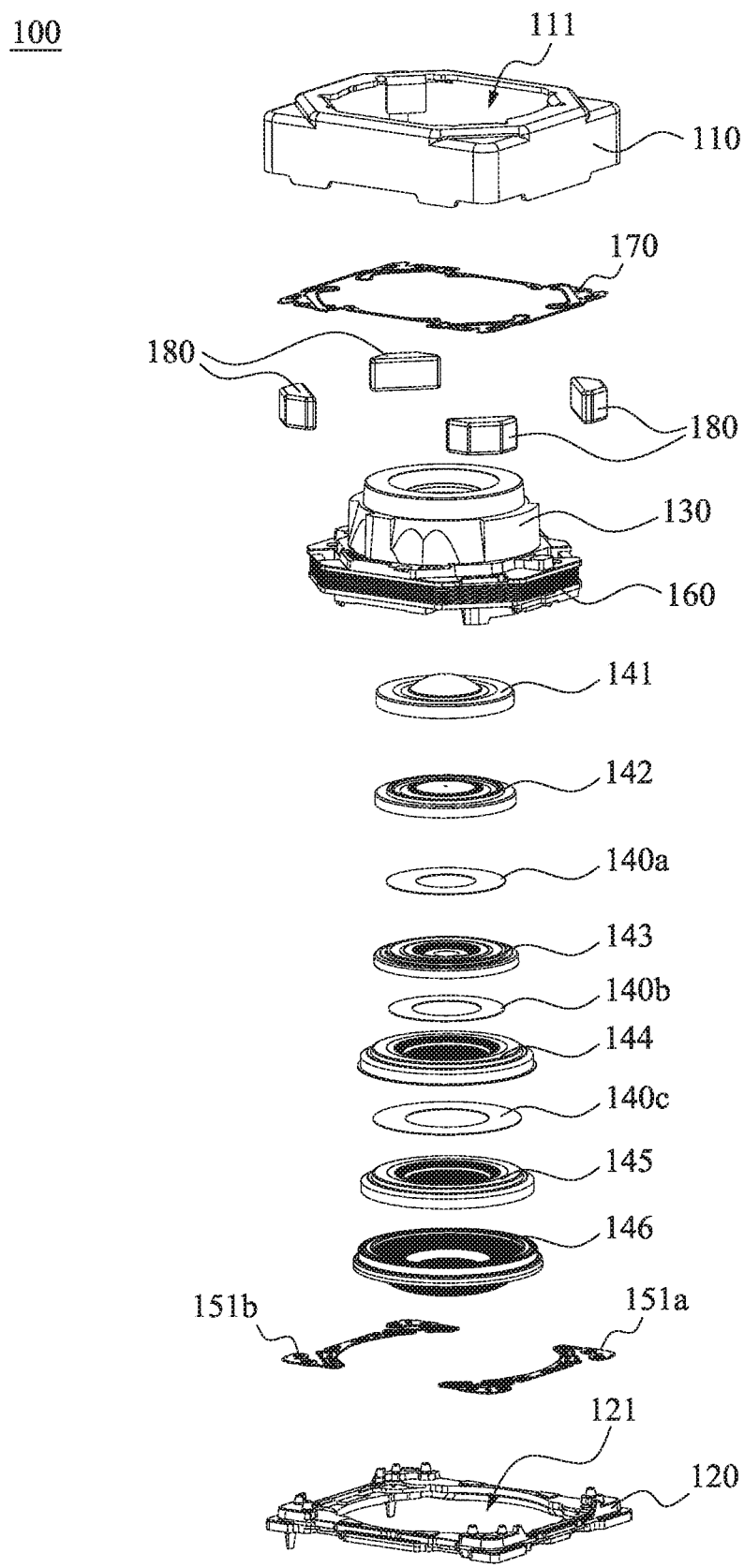
FIG. 2 is an exploded view of the camera module according to the 1st example of FIG. 1.
Figure 3:
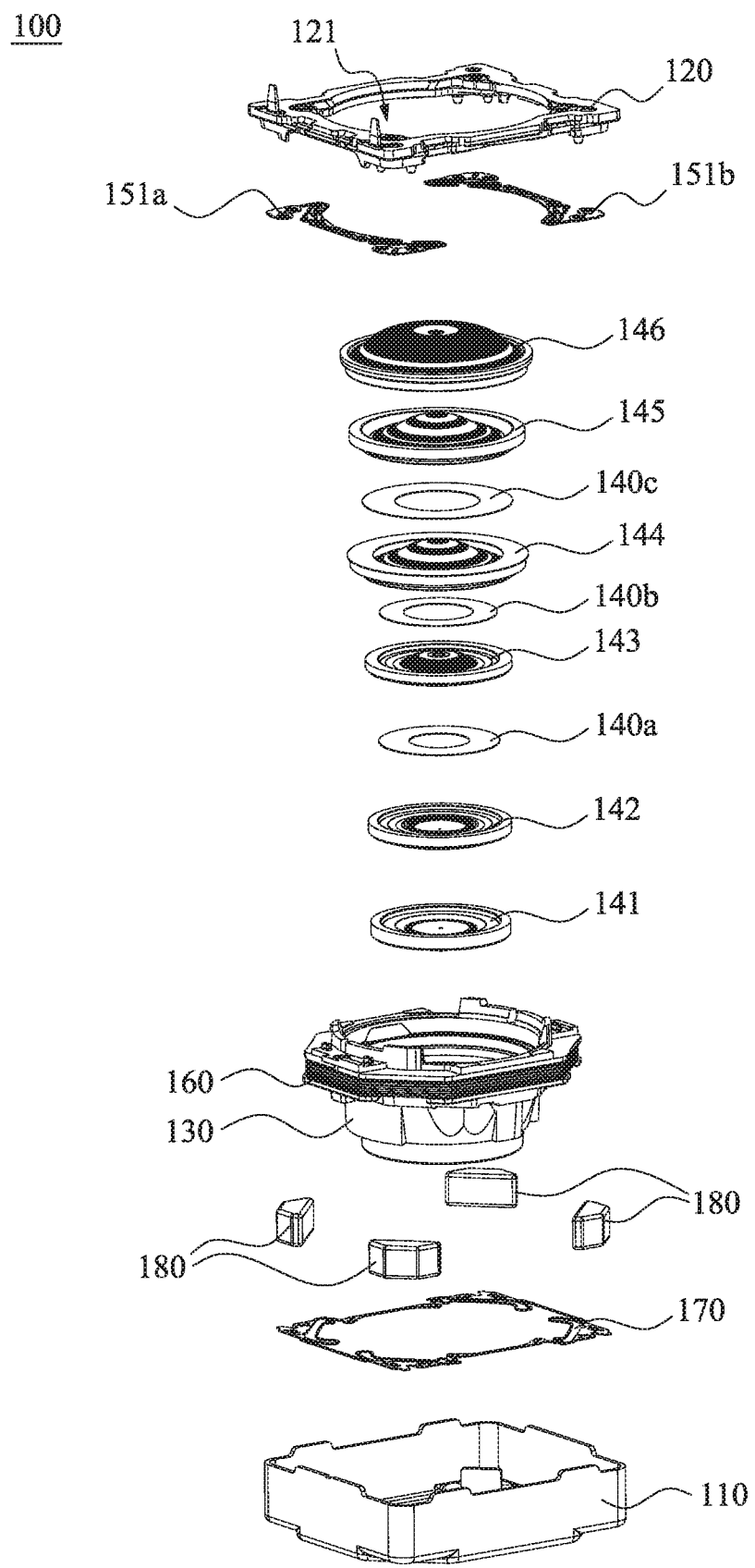
FIG. 3 is another exploded view of the camera module according to the 1st example of FIG. 1.

FIG. 1 shows a schematic view of a camera module 100 according to the 1st example of the present disclosure, FIG. 2 is an exploded view of the camera module 100 according to the 1st example of FIG. 1, and FIG. 3 is another exploded view of the camera module 100 according to the 1st example of FIG. 1. In FIGS. 1, 2 and 3, the camera module 100 includes a metal yoke 110, a holding base 120, a plastic barrel 130, a plurality of plastic lens elements 141, 142, 143, 144, 145, 146, a leaf spring pair (its reference numeral is omitted), and a coil element 160.

In detail, the metal yoke 110 has an opening 111. The holding base 120 is connected to the metal yoke 110 and defines an inner space (its reference numeral is omitted). The holding base 120 has a through hole 121 which is corresponding to the opening 111 of the metal yoke 110. The plastic barrel 130 is movably disposed in the inner space. The plastic lens elements 141, 142, 143, 144, 145, 146 are disposed in the plastic barrel 130. The leaf spring pair includes two leaf springs 151a, 151b which are located on a same plane and connected to the plastic barrel 130. The coil element 160 surrounds an outer surface of the plastic barrel 130 and is electrically connected to the leaf spring pair. The camera module 100 further includes an elastic supporting element 170 and a plurality of magnetic elements 180. The elastic supporting element 170 is connected to the plastic barrel 130, and the magnetic elements 180 are disposed in the inner space. By the arrangement, the camera module 100 can provide an autofocus function.

Figure 4:
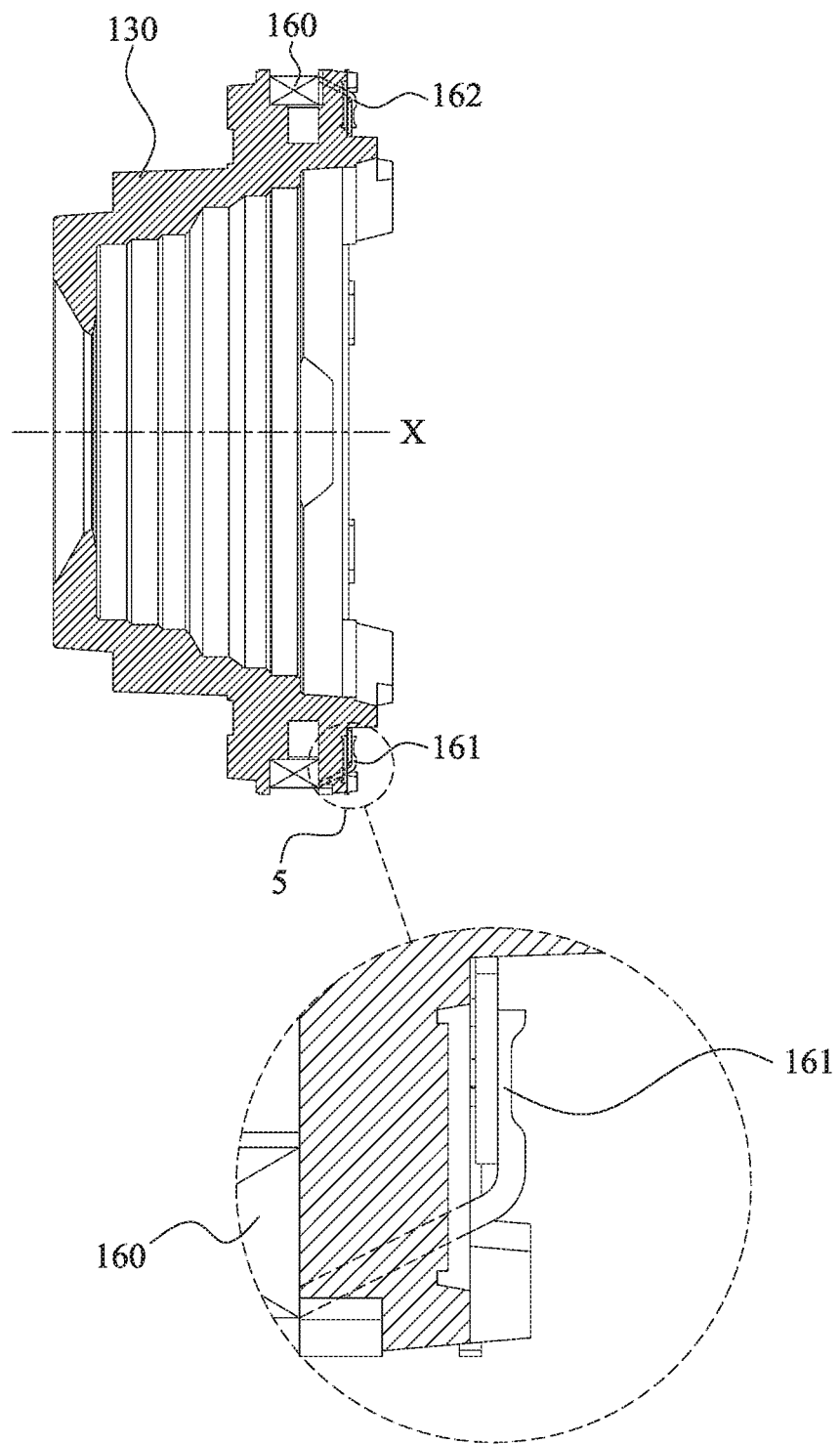
FIG. 4 is a cross-sectional view of the camera module according to the 1st example of FIG. 1.
Figure 5:
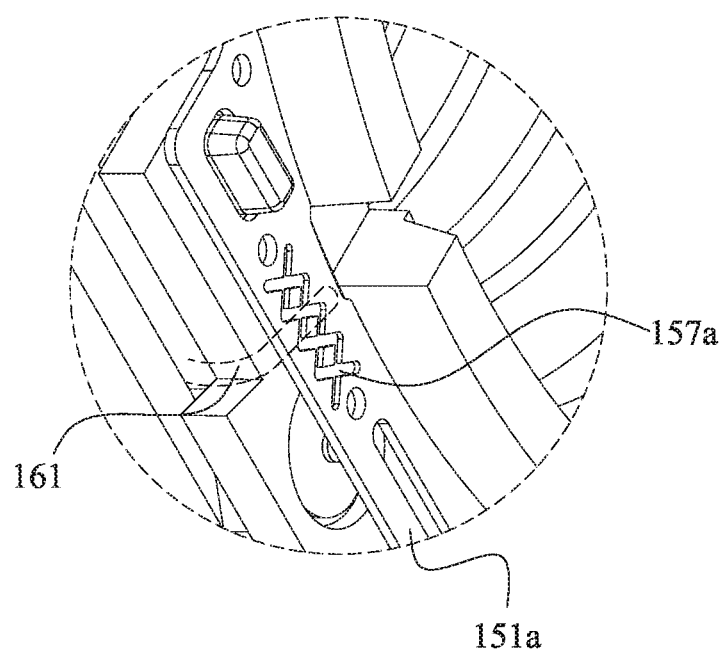
FIG. 5 is an enlarged schematic view of the portion 5 in FIG. 4.
Figure 6:
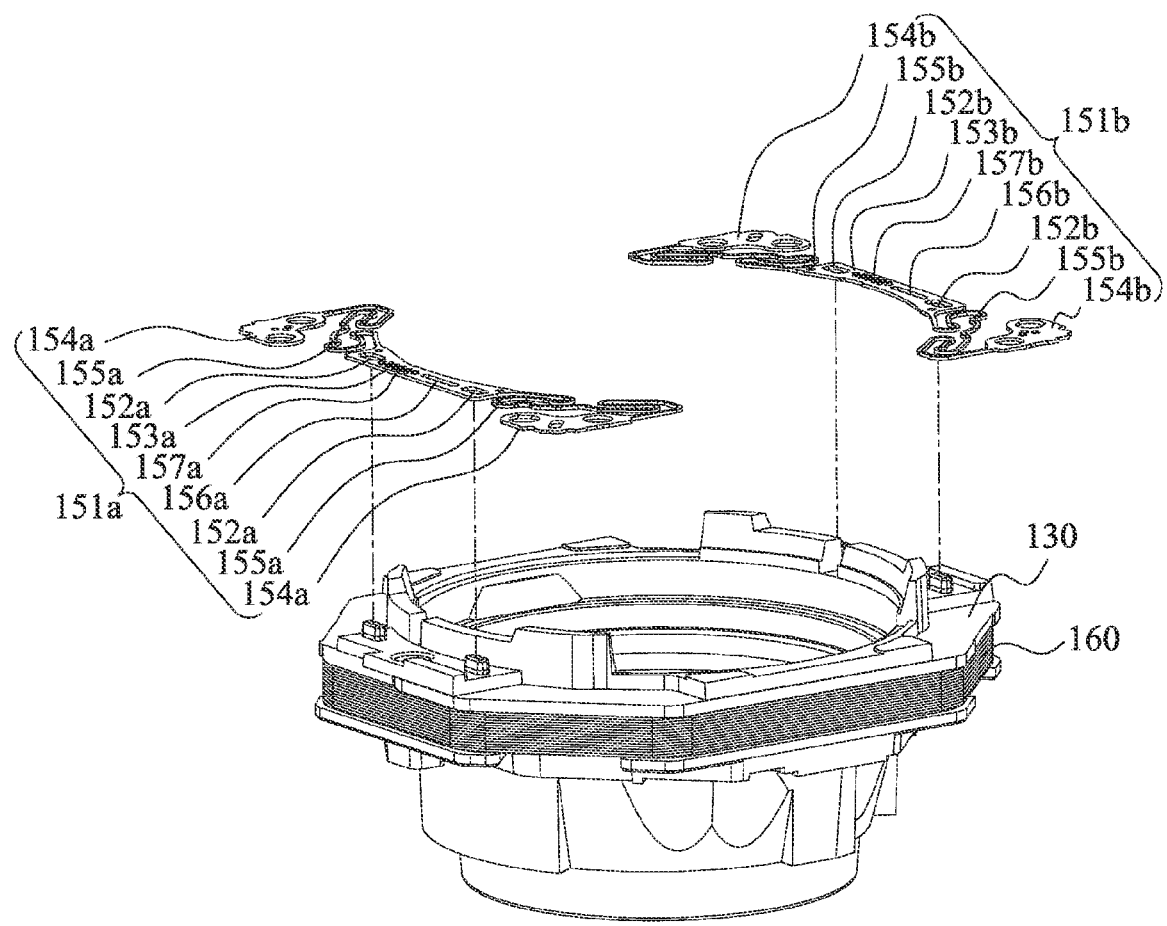
FIG. 6 is a schematic view of the leaf spring pair and the plastic barrel of the camera module according to the 1st example of FIG. 1.

In FIGS. 4, 5, and 6, wherein FIG. 4 is a cross-sectional view of the camera module 100 according to the 1st example of FIG. 1, FIG. 5 is an enlarged schematic view of the portion 5 in FIG. 4, and FIG. 6 is a schematic view of the leaf spring pair and the plastic barrel 130 of the camera module 100 according to the 1st example of FIG. 1. Each of the leaf springs 151a, 151b includes at least two positioning holes 152a, 152b for connecting to the plastic barrel 130. One end 161 of the coil element 160 is connected between the positioning holes 152a of the leaf spring 151a, and the other end 162 of the coil element 160 is connected between the positioning holes 152b of the other one of the leaf springs 151b, and the coil element 160 is connected to the leaf springs 151a, 151b by a thermal pressing method. That is, the leaf spring pair is two leaf springs 151a, 151b electrically separated on a same plane, which is electrically connected to the two ends 161, 162 of the coil element 160, respectively. Hence, the external thermal influence on the plastic barrel 130 can be avoided by connecting the two ends 161, 162 of the coil element 160 to the leaf springs 151a, 151b in the thermal pressing method. Moreover, the two ends 161, 162 of the coil element 160 are positioned between the positioning holes 152a, 152b, respectively, so that the leaf springs 151a, 151b can be prevented from being deformed after the thermal pressing which would affect the assembling with the plastic barrel 130.

In detail, each of the leaf springs 151a, 151b include an inner fixing portion 153a, 153b, at least one outer fixing portion 154a, 154b, and at least one elastic portion 155a, 155b. The inner fixing portions 153a, 153b are connected to the plastic barrel 130, and the positioning holes 152a, 152b are disposed on the inner fixing portions 153a, 153b. The outer fixing portions 154a, 154b are connected to the holding base 120. The elastic portions 155a, 155b are connected to the inner fixing portions 153a, 153b and the outer fixing portions 154a, 154b. In particular, in FIG. 6, in each of the leaf springs 151a, 151b, and the number of each of the outer fixing portions 154a, 154b and the elastic portions 155a, 155b is two. The two outer fixing portions 154a are symmetrically disposed on the two sides of the inner fixing portion 153a via the two elastic portions 155a, and the two outer fixing portions 154b are symmetrically disposed on the two sides of the inner fixing portion 153b via the two elastic portions 155b. Therefore, when the camera module performs autofocus, the leaf spring pair can stably provide the degree of freedom of the plastic barrel 130 to move along the direction of the optical axis X.

Moreover, in the 1st example, the camera module 100 further includes the elastic supporting element 170. The leaf spring pair and the elastic supporting element 170 can be deemed as elastic supporting mechanisms, which are respectively assembled with the plastic barrel 130, and provide the degree of freedom to the plastic barrel 130 so as to move along the direction of the optical axis X during autofocus. In FIGS. 2 and 3, the leaf spring pair is connected to one end of the plastic barrel 130 closer to the holding base 120, and the elastic supporting element 170 is connected to one end of the plastic barrel 130 farer away from the holding base 120, wherein the leaf spring pair and the elastic supporting element 170 can be arranged into one piece on demand (such as the elastic supporting element 170 shown in FIG. 2) or in a group form (such as the leaf springs 151a, 151b of the 1st example) to form a conductor path of the coil element 160 so as to transmit the electronic driving signal which would be input to the coil element 160, but is not limited to the present disclosure.

Figure 7:
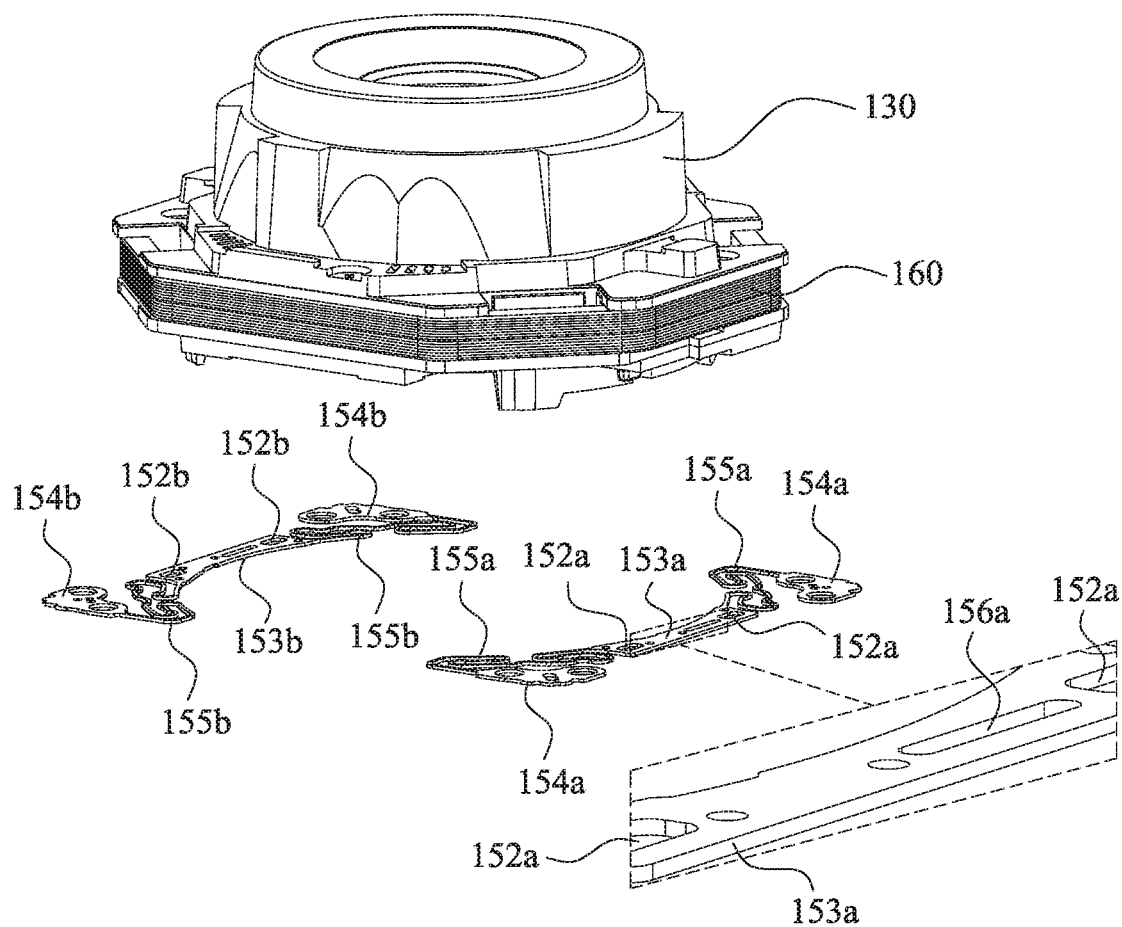
FIG. 7 is another schematic view of the leaf spring pair and the plastic barrel of the camera module according to the 1st example of FIG. 1.
Figure 8:
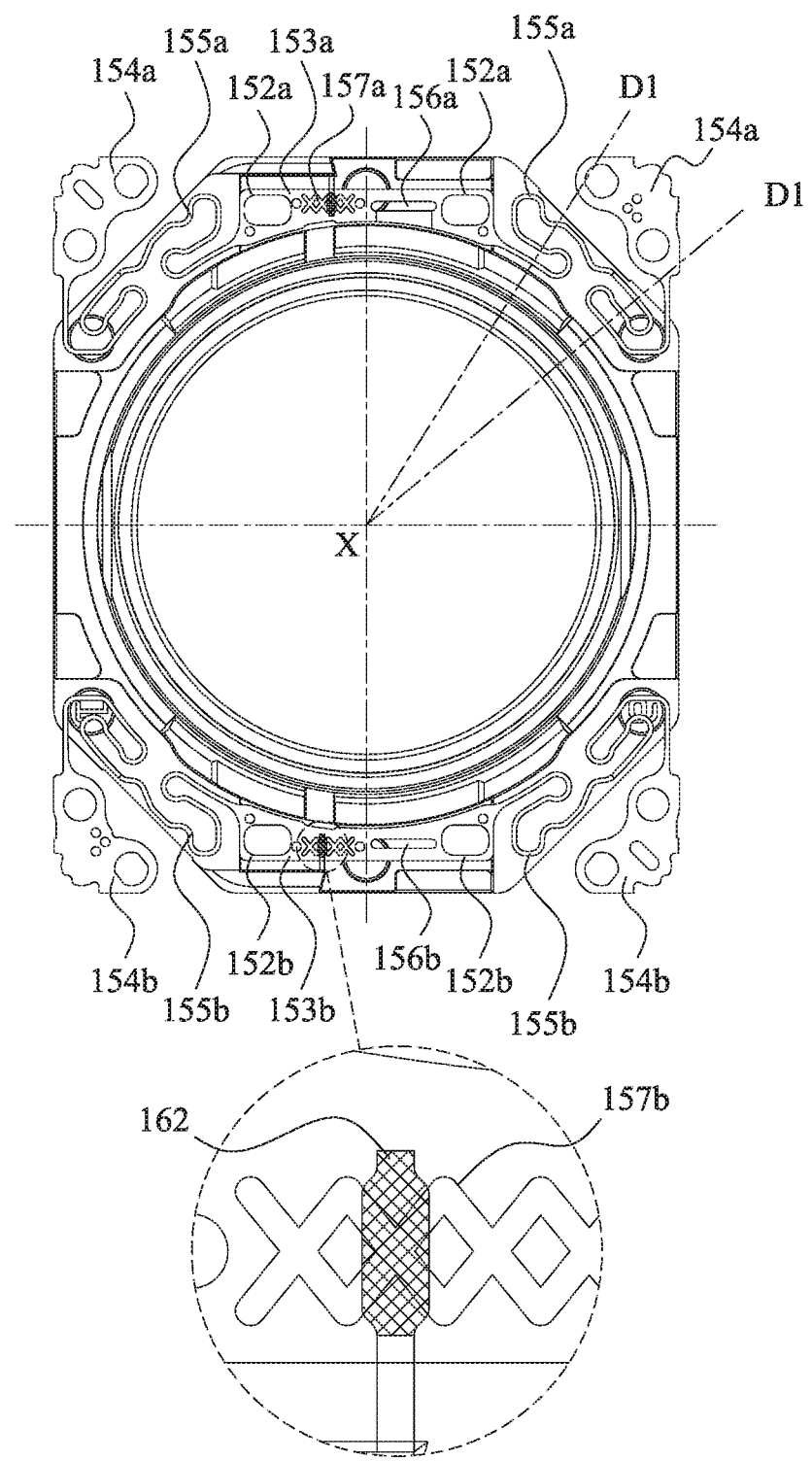
FIG. 8 is a bottom view of the leaf spring pair and the plastic barrel of the camera module according to the 1st example of FIG. 1.

In FIGS. 7 and 8, wherein FIG. 7 is another schematic view of the leaf spring pair and the plastic barrel 130 of the camera module 100 according to the 1st example of FIG. 1, and FIG. 8 is a bottom view of the leaf spring pair and the plastic barrel 130 of the camera module 100 according to the 1st example of FIG. 1. In each of the leaf springs 151a, 151b, the inner fixing portions 153a, 153b may include thickness reducing area 157a, 157b disposed between the positioning holes 152a, 152b respectively, and the two ends 161, 162 of the coil element 160 are connected to the thickness reducing area 157a, 157b, respectively. By the arrangement of the thickness reducing area 157a, 157b, the small block structures can be formed, which can increase the surface area of heat dissipation, and improve the heat dissipation efficiency of partial area, so as to prevents the elastic portion 155a, 155b from unnecessary thermal effect. In the 1st example, the thickness reducing area 157a, 157b are a crossed pattern, which can increase the contact surface area of the coil element 160 therewith, but the present disclosure is not limited thereto.

In each of the leaf springs 151a, 151b, the inner fixing portions 153a, 153b may further include the flexible structures 156a, 156b disposed between the positioning holes 152a, 152b, respectively. By the arrangement of the flexible structures 156a, 156b, when the thermal pressing operation is performed, the pressure applied to the inner fixing portion 153a, 153b can be further buffered so as to reduce the bending deformation therefrom. In the 1st example, the flexible structures 156a, 156b are a strip hole, which favorable for manufacturing the leaf springs 151a, 151b more easily, but the present disclosure is not limited thereto.

In FIG. 8, the elastic portions 155a, 155b of the leaf springs 151a, 151b overlap along a radial direction D1 perpendicular to an optical axis X. In particular, in the limited space, the elastic portions 155a, 155b are lengthened and arranged in the bent shape, the tilting of the plastic barrel 130 would not occur easily during the focusing movement. Furthermore, the elastic portions 155a, 155b of the leaf springs 151a, 151b and the inner fixing portions 153a, 153b do not overlap along the radial direction D1 perpendicular to the optical axis X. Therefore, when the inner fixing portions 153a, 153b is operated by the thermal pressing operation, the elastic portions 155a, 155b are not affected.

In the 1st example, the plastic barrel 130 is a threadless structure. That is, the plastic barrel 130 is integrated with the carrier and the barrel structure of the conventional art, which can effectively eliminate assembling tolerances and enhance the quality of the camera module. Moreover, in FIGS. 6 and 7, one end of the plastic barrel 130 farer away from the holding base 120 is a circular-shaped and the other end of the plastic barrel 130 is a polygonal-shaped, wherein the end of the circular-shaped is for receiving the incident light so as to maintain the stable manufacturing quality and effectively avoid the appearance of flaws in the injection molding process. The coil element 160 surrounds the end being polygonal-shaped of the plastic barrel 130, which is favorable for assembling the coil element 160 on the plastic barrel 130 through machine automation.

In FIGS. 2 and 3, in the plastic barrel 130, a light blocking element 140a can be disposed between the plastic lens element 142 and the plastic lens element 143. A light blocking element 140b can be disposed between the plastic lens element 143 and the plastic lens element 144. A light blocking element 140c can be disposed between the plastic lens element 144 and the plastic lens element 145. The number of plastic lens elements and the number and type of the light shielding elements can be replaced on demand, and the present disclosure would not be limited thereto.

2nd Example

Figure 9:
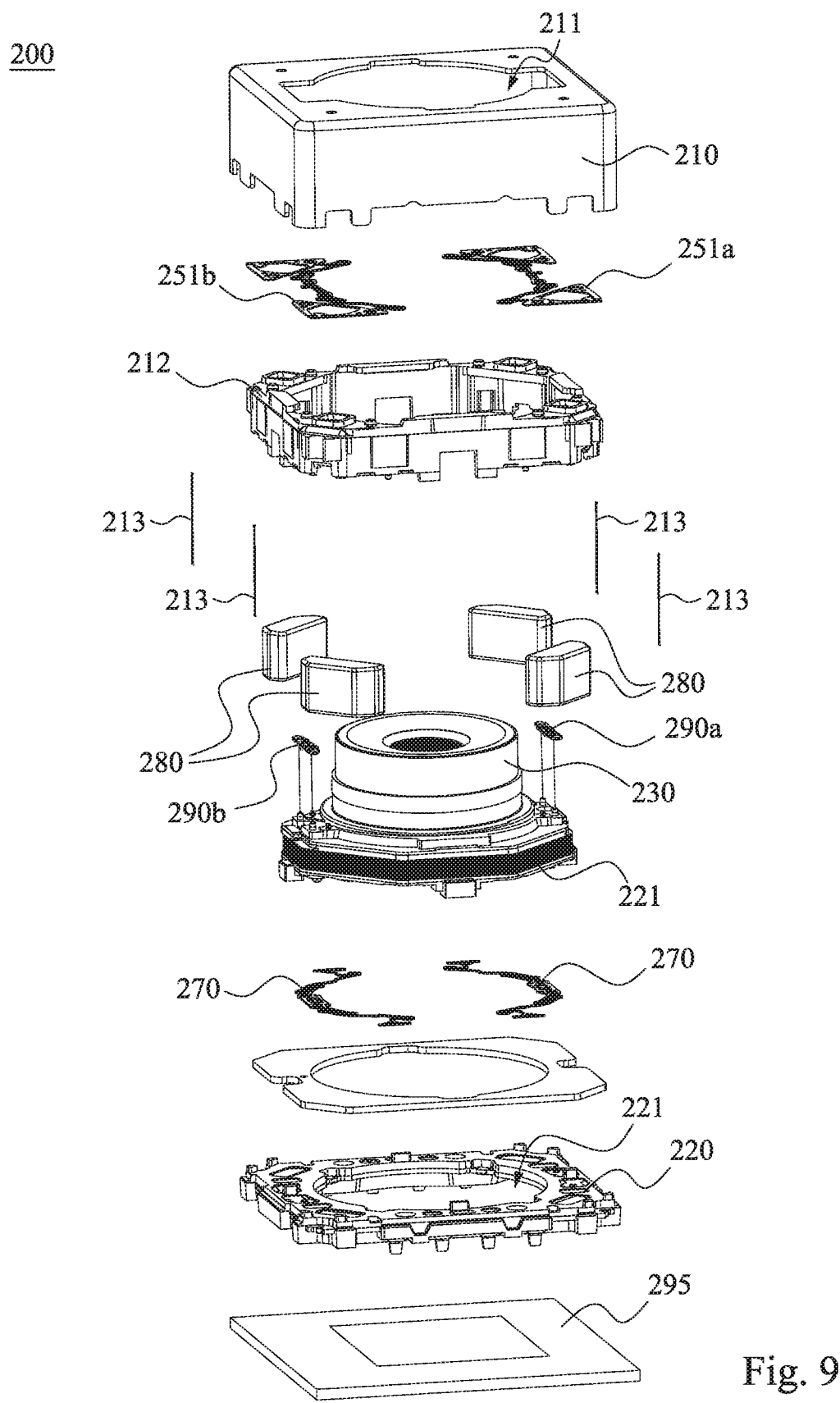
FIG. 9 is an exploded view of a camera module according to the 2nd example of the present disclosure.
Figure 10:
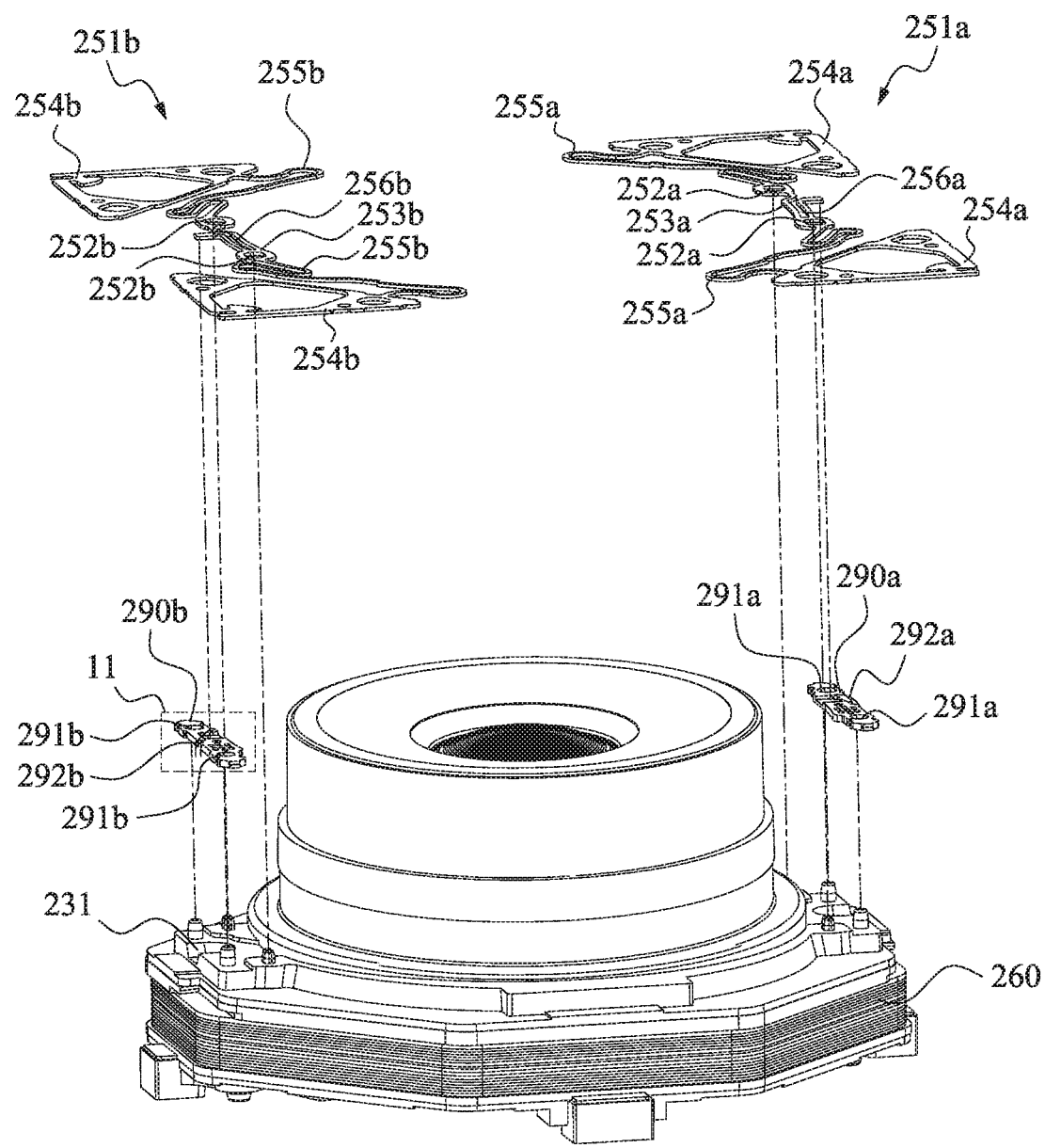
FIG. 10 is a schematic view of the leaf spring pair and the metal plate pair according to the 2nd example of FIG. 9.

FIG. 9 shows an exploded view of a camera module 200 according to the 2nd example of the present disclosure. FIG. 10 is a schematic view of the leaf spring pair and the metal plate pair according to the 2nd example of FIG. 9. In FIG. 9, the camera module 200 includes a metal yoke 210, a holding base 220, a plastic barrel 230, a plurality of plastic lens elements (not shown), a leaf spring pair (its reference numeral is omitted), a metal plate pair (its reference numeral is omitted) and a coil element 260.

In detail, the metal yoke 210 has an opening 211. The holding base 220 is connected to the metal yoke 210 and defines an inner space (its reference numeral is omitted). The holding base 220 has a through hole 221 which is corresponding to the opening 210 of the metal yoke 210. The plastic barrel 230 is movably disposed in the inner space and the plastic lens elements are deposed in the plastic barrel 230. The leaf spring pair includes two leaf springs 251a, 251b which are located on a same plane and connected to the plastic barrel 230. The metal plate pair includes two metal plates 290a, 290b which are electrically connected to the leaf springs 251a, 251b and connected to the plastic barrel 230, respectively. The coil element 260 surrounds an outer surface of the plastic barrel 230 and is electrically connected to the metal plate pair. The camera module 200 further includes an elastic supporting element 270 and a plurality of magnetic elements 280. The elastic supporting element 270 is connected to the plastic barrel 230, and the magnetic elements 280 are disposed in the inner space. By the arrangement, the camera module 200 can provide an autofocus function.

Figure 11:
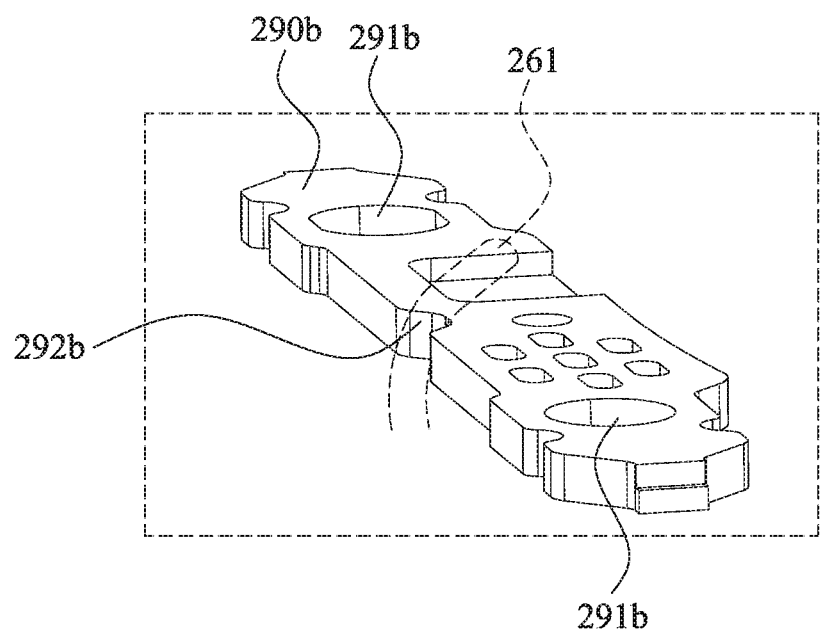
FIG. 11 shows an enlarged schematic view of the portion 11 of the metal plate in FIG. 10.

FIG. 11 shows an enlarged schematic view of the portion 11 of the metal plate 290b in FIG. 10. In the 2nd example, the camera module 200 includes the metal plate pair, which includes two metal plates 290a, 290b. Each of the metal plates 290a, 290b includes at least two positioning holes 291a, 292b for connecting to the plastic barrel 230. One end (its reference numeral is omitted) of the coil element 260 is connected between the positioning holes 291a of the metal plate 290a, and the other end 261 of the coil element 260 is connected between the positioning holes 291b of the other one of the metal plates 290b, and the coil element 260 is connected to the metal plates 290a, 290b by a thermal pressing method. Different from the 1st example, the camera module 200 of the 2nd example further includes the metal plate pair, which can absorb most of the residual heat of the thermal pressing operation so as to further reducing the area of the leaf spring pair and reducing the influence of residual heat. Moreover, the thicknesses of the metal plates 290a, 290b can be larger than that the thicknesses of the leaf springs 251a, 251b, and can be used as a washer for the thermal pressing operation to reduce the leaf springs 251a, 251b from pressing and the deformation thereof.

In FIG. 11, the metal plates 290a, 290b can further include notch structures 292a, 292b for receiving the coil element. Therefore, the two ends of the coil element 260 close to the metal plates 292a, 292b can be preset to reduce the difficulty of thermal pressing operation. Moreover, in FIG. 10, an air gap 231 is formed between the plastic barrel 230 and the metal plate pair. That is, the air gap 231 is formed between the plastic barrel 230 and the metal plate pair. Therefore, it is favorable for quickly eliminating the high temperature and high heat of the metal plate pair so as to avoid the plastic barrel receiving all the waste heat generated by the thermal pressing operation, and increasing the risk of melting and affecting the plastic lens elements in the plastic barrel.

In FIG. 10, the leaf springs 251a, 251b respectively include inner fixing portions 253a, 253b and are connected to the plastic barrel 230. In detail, the inner fixing portions 253a, 253b include at least two positioning holes 252a, 252b for connecting to the plastic barrel 230. The inner fixing portions 253a, 253b can further include the elastic structures 256a, 256b, which are disposed between the positioning holes 252a, 252b. Moreover, the leaf springs 251a, 251b can further include the elastic portions 255a, 255b, which are connected to the inner fixing portion 253a, 253b, respectively. In the 1st example of FIG. 8, the elastic portions 255a, 255b of the 2nd example overlap along a radial direction perpendicular to an optical axis, and the elastic portion 255a, 255b and the inner fixing portion 253a, 253b do not overlap along the radial direction perpendicular to the optical axis.

Moreover, the leaf springs 251a, 251b can further include the outer fixing portion 254a, 254b, which are connected to the elastic portion 255a, 255b. In particular, in FIG. 10, each of the leaf springs 251a, 251b, and the number of the outer fixing portions 254a, 254b and the number of the elastic portions 255a, 255b are two, respectively. The two outer fixing portions 254a are symmetrically disposed on the two sides of the inner fixing portion 253a via the two elastic portions 255a, and the two outer fixing portions 254b are symmetrically disposed on the two sides of the inner fixing portion 253b via the two elastic portions 255b.

Moreover, in the 2nd example, the number and arrangement of the plastic barrel and the arrangement of other optical components may be the same as the arrangements of the 1st example, and are not described again herein.

In FIG. 9, the camera module 200 further includes the elastic supporting element 270 for cooperating with the leaf spring pair to provide the degree of freedom of the plastic barrel 230 to move along the direction of the optical axis during autofocus. Moreover, the camera module 200 further includes an auxiliary frame 212 and a plurality of suspension lines 213. The auxiliary frame 212 is disposed in the metal yoke 210, which is for positioning the magnetic elements 280, it is favorable for ensuring the plastic lens elements in the plastic barrel 230 to move along the direction of the optical axis during autofocus. The suspension lines 213 connect the auxiliary frame 212 and the holding base 220 so as to maintain the stability of the mechanism during autofocus.

Furthermore, when the camera module 200 is applied on the electronic device, the imaging element 295 can be disposed on the holding base 220.

3rd Example

Figure 12A:
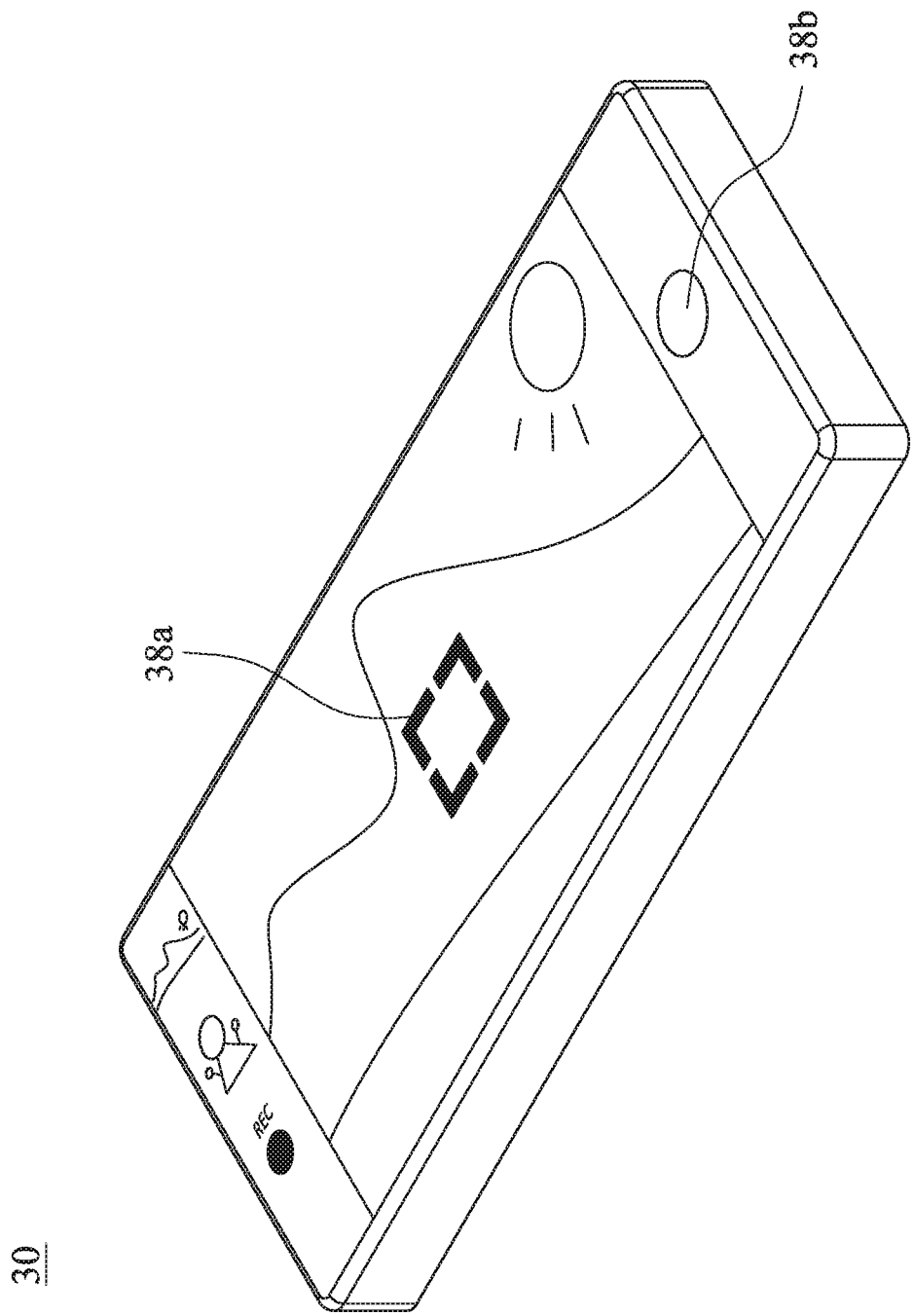
FIG. 12A is a schematic view of an electronic device according to the 3rd example of the present disclosure.
Figure 12B:
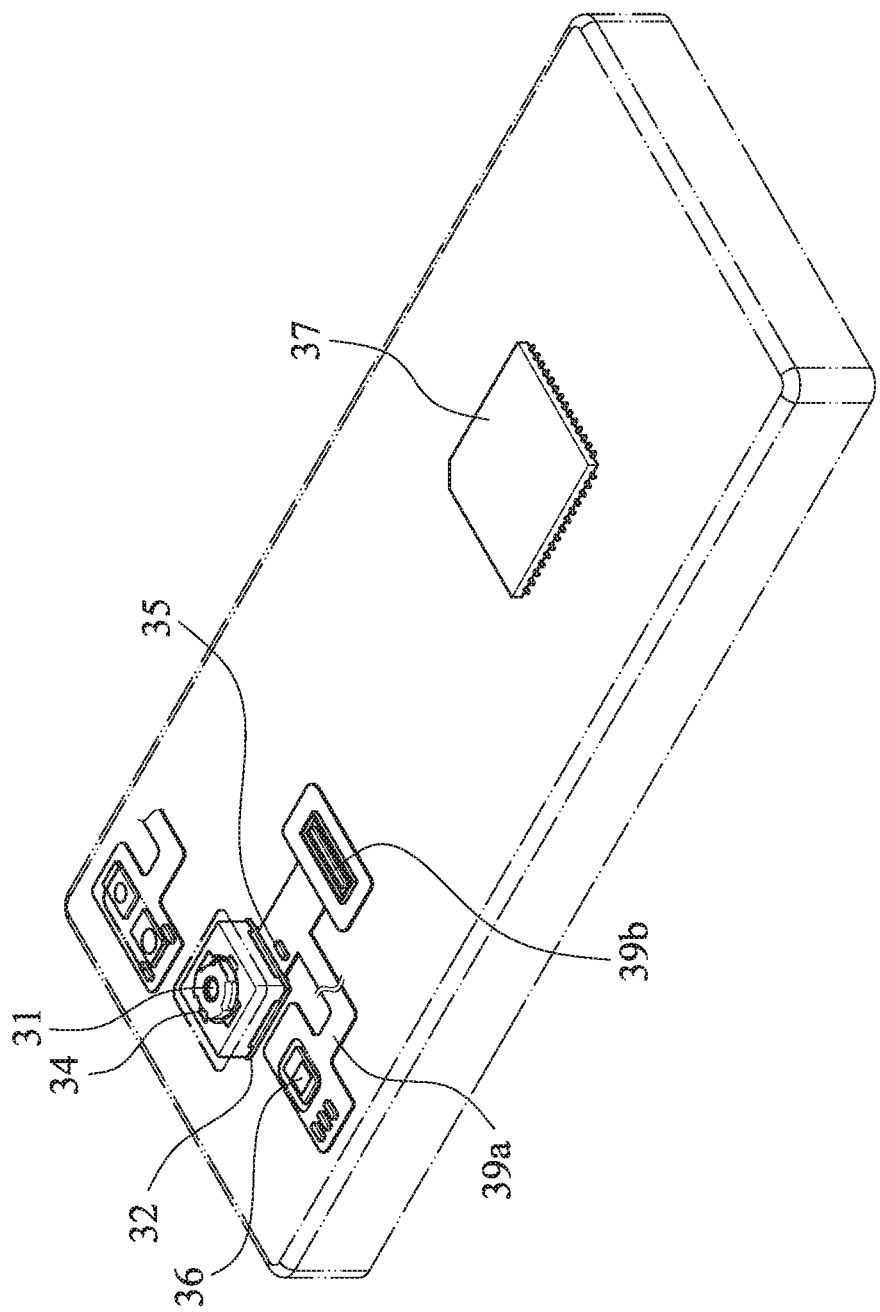
FIG. 12B is another schematic view of the electronic device according to the 3rd example.

FIG. 12A is a schematic view of an electronic device 30 according to the 3rd example of the present disclosure, and FIG. 12B is another schematic view of the electronic device 30 according to the 3rd example. In FIGS. 12A and 12B, the electronic device 30 of the 3rd example is a smart phone, and the electronic device 30 includes the camera module 31 according to the present disclosure and the image sensor 32, wherein the camera module 31 can be any one of the camera modules in the foregoing examples, but will not be limited thereto, and the image sensor 32 is disposed on an image surface (not shown) of the camera module 31. Therefore, it is favorable for satisfying requirements of the mass production and appearance of the camera module applied to the electronic device nowaday.

Furthermore, the user enters the shooting mode through the user interface 38 of the electronic device 30, wherein the user interface of the 3rd example can be a touch screen 38a, a button 38b, etc. At this time, the camera module 31 collects the imaging light on the image sensor 32, and outputs an electronic signal about the image to an Image Signal Processor (ISP) 37.

Figure 12C:
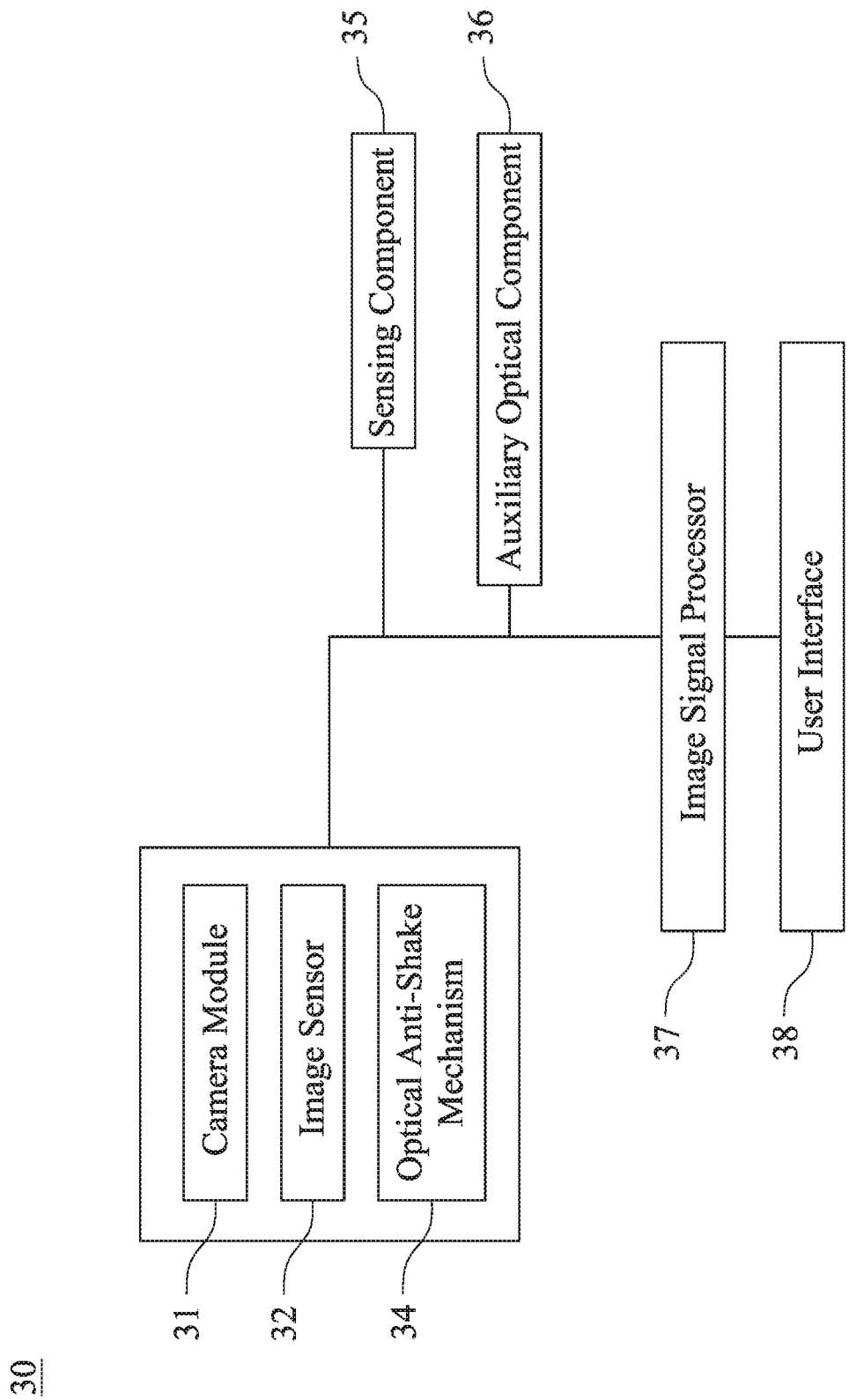
FIG. 12C is a block diagram of the electronic device according to the 3rd example.

FIG. 12C shows a block diagram of the electronic device 30 according to the 3rd example, and particularly a camera block diagram in the electronic device 30. In FIGS. 12A to 12C, in response to the camera specifications of the electronic device 30, the electronic device 30 may further include an optical anti-shake component 34. Furthermore, the electronic device 30 can further include at least one auxiliary optical element 36 and at least one sensing element 35. The auxiliary optical element 36 can be a flash module that compensates for color temperature, an infrared ranging component, a laser focusing module, etc. The sensing element 35 can have a function of sensing physical momentum and actuation energy, such as an accelerometer, a gyroscope, and a Hall Effect Element to sense the shaking and shaking applied by the user's hand or the external environment. Further, the autofocus function and the optical anti-shake component 34 configured by the camera module 31 in the electronic device 30 are facilitated to obtain good imaging quality, and the electronic device 30 according to the present disclosure has a plurality of modes of shooting functions, such as optimized self-timer, low light source HDR (High Dynamic Range imaging), high resolution 4K (4K Resolution) video. Moreover, the user can directly view the camera's shooting screen from the touch screen and manually operate the viewing range on the touch screen to achieve the autofocus function of what you see is what you get.

Moreover, in FIG. 12B, the camera module 31, the image sensor 32, the optical anti-shake component 34, the sensing element 35 and the auxiliary optical element 36 can be disposed on a Flexible Printed Circuit Board (FPC) 39a and electrically connected to the imaging signal processing component 37 through the connector 39b to execute the photographing process. The current electronic devices, such as smart phones, have a thin and light trend. The camera module and its imaging lens and related components are arranged on a flexible circuit board, and then the circuit is integrated into the main board of the electronic device by using a connector, which can meet the limited space of the mechanism design and the circuit layout requirements, and the greater margin is achieved, and the autofocus function of the imaging lens is more flexibly controlled by the touch screen of the electronic device. In the third embodiment, the electronic device 30 can include a plurality of the sensing elements 35 and a plurality of the auxiliary optical elements 36. The sensing elements 35 and the auxiliary optical elements 36 are disposed on the FPC board 39a and at least one other FPC board (no label) and electrically connected to the imaging signal processing component 37 through the corresponding connector to execute the photographing process. In other embodiments (no view), the sensing element and the auxiliary optical element can also be disposed on the main board of the electronic device or other forms of the carrier according to the mechanism design and the circuit layout requirements.

Furthermore, the electronic device 30 can further include, but is not limited to, a display unit, a control unit, a storage unit, a Random Access Memory unit (RAM), a Read-Only Memory unit (ROM), or a combination thereof.

4th Example

Figure 13:
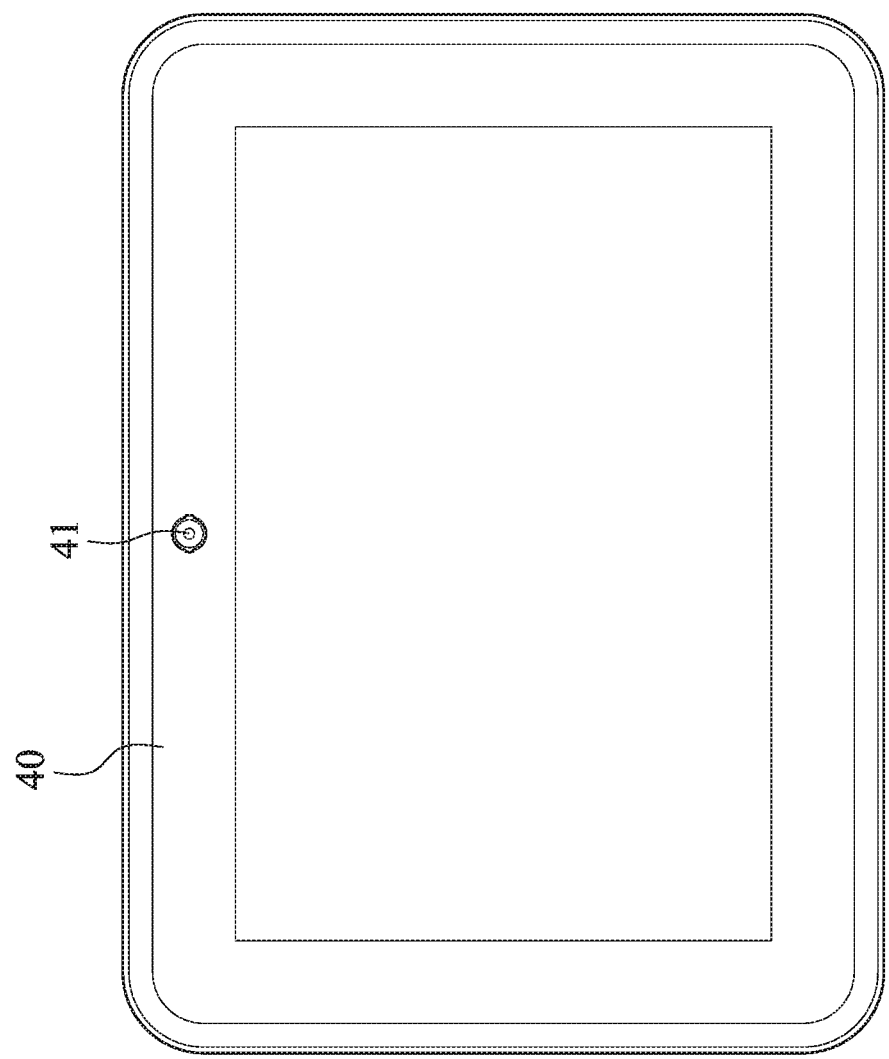
FIG. 13 is a schematic view of an electronic device according to the 4th example of the present disclosure.

FIG. 13 shows a schematic view of an electronic device 40 according to the 4th example of the present disclosure. The electronic device 40 of the 4th example is a tablet computer. The electronic device 40 includes a camera module 41 according to the present disclosure and an image sensor (not shown), wherein the image sensor is disposed on an imaging surface (not shown) of the camera module 41.

5th Example

Figure 14:
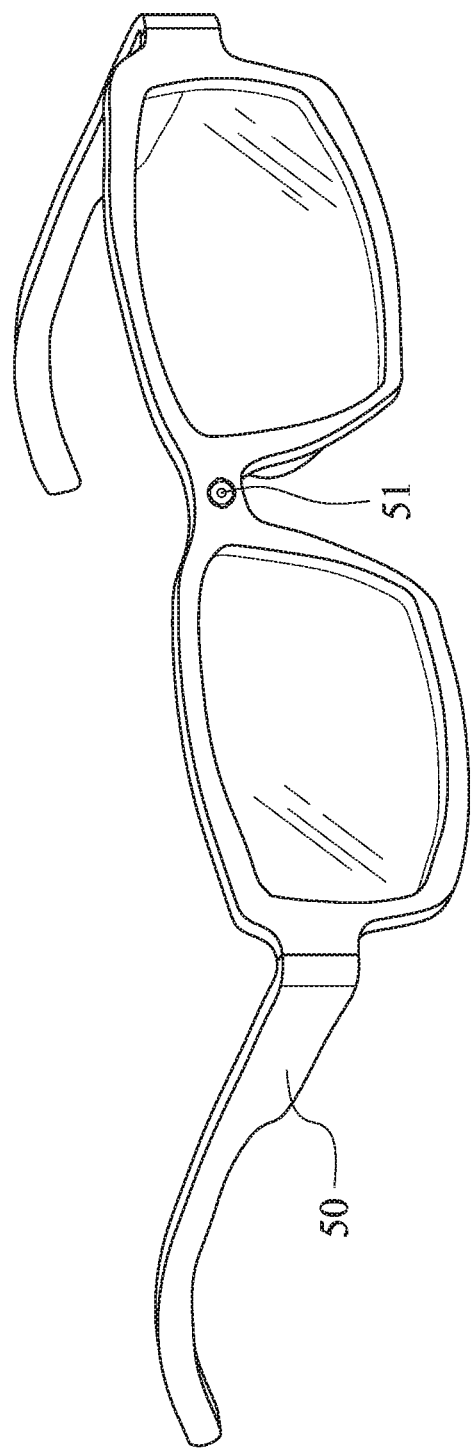
FIG. 14 is a schematic view of an electronic device according to the 5th example of the present disclosure.

FIG. 14 shows a schematic view of an electronic device 50 according to the 5th example of the present disclosure. The electronic device 50 of the 5th example is a wearable device. The electronic device 50 includes a camera module 51 according to the present disclosure and an image sensor (not shown), wherein the image sensor is disposed on an imaging surface (not shown) of the camera module 51.

The foregoing description, for purpose of explanation, has been described with reference to specific embodiments and examples. The embodiments and examples were chosen and described in order to best explain the principles of the disclosure and its practical applications, to thereby enable others skilled in the art to best utilize the disclosure and various embodiments and examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
   a metal yoke having an opening;
   a holding base connected to the metal yoke and defining an inner space, the holding base having a through hole which is corresponding to the opening of the metal yoke;
   a plastic barrel movably disposed in the inner space;
   a plurality of plastic lens elements disposed in the plastic barrel;
   a leaf spring pair comprising two leaf springs which are located on a same plane and connected to the plastic barrel, wherein each of the leaf springs comprises at least two positioning holes for connecting to the plastic barrel; and
   a coil element surrounding an outer surface of the plastic barrel and electrically connected to the leaf spring pair, wherein one end of the coil element is connected between the at least two positioning holes of one of the leaf springs, and the other end of the coil element is connected between the at least two positioning holes of the other one of the leaf springs, and the coil element is connected to the leaf springs by a thermo-compression manner;
   wherein at least one of the two leaf springs of the leaf spring pair further comprises:
   an inner fixing portion connected to the plastic barrel, wherein the inner fixing portion comprises the at least two positioning holes for connecting to the plastic barrel and a thickness reducing area disposed between the at least two positioning holes, the end of the coil element is connected to the thickness reducing area, and the thickness reducing area comprises a crossed pattern.

2. The camera module of claim 1, wherein the at least one of the two leaf springs of the leaf spring pair further comprises:
   at least one outer fixing portion connected to the holding base; and
   at least one elastic portion connected to the inner fixing portion and the outer fixing portion.

3. The camera module of claim 2, wherein the elastic portion of the at least one leaf spring overlaps along a radial direction perpendicular to an optical axis.

4. The camera module of claim 2, wherein the elastic portion of the at least one leaf spring and the inner fixing portion do not overlap along a radial direction perpendicular to an optical axis.

5. The camera module of claim 1, wherein the inner fixing portion comprises:
   a flexible structure disposed between the at least two positioning holes.

6. The camera module of claim 5, wherein the flexible structure is a strip hole.

7. The camera module of claim 1, wherein the plastic barrel is a threadless structure.

8. The camera module of claim 1, wherein one end of the plastic barrel away from the holding base is a circular-shaped, and the other end of the plastic barrel is a polygonal-shaped.

9. The camera module of claim 8, wherein the coil element surrounds the end of the plastic barrel being the polygonal-shaped.

10. An electronic device, comprising:
    the camera module of claim 1; and
    an image sensor disposed on an image surface of the camera module.

11. A camera module, comprising:
    a metal yoke having an opening;
    a holding base connected to the metal yoke and defining an inner space, the holding base having a through hole which is corresponding to the opening of the metal yoke;
    a plastic barrel movably disposed in the inner space;
    a plurality of plastic lens elements disposed in the plastic barrel;
    a leaf spring pair comprising two leaf springs which are located on a same plane and connected to the plastic barrel;
    a metal plate pair comprising two metal plates which are electrically connected to the leaf springs, respectively, wherein each of the metal plates comprises at least two positioning holes for connecting to the plastic barrel; and
    a coil element surrounding an outer surface of the plastic barrel and electrically connected to the metal plate pair, wherein one end of the coil element is connected between the at least two positioning holes of one of the metal plates, and the other end of the coil element is connected between the at least two positioning holes of the other one of the metal plates, and the coil element is connected to the metal plates by a thermo-compression manner;
    wherein at least one of the two leaf springs of the leaf spring pair further comprises:
    an inner fixing portion connected to the plastic barrel, wherein the inner fixing portion comprises at least two positioning holes for connecting to the plastic barrel.

12. The camera module of claim 11, wherein the inner fixing portion further comprises:
    a flexible structure disposed between the at least two positioning holes of the inner fixing portion.

13. The camera module of claim 11, wherein the at least one of the two leaf springs of the leaf spring pair further comprises:

at least one elastic portion overlaps along a radial direction perpendicular to an optical axis.

14. The camera module of claim 11, wherein the at least one of the two leaf springs of the leaf spring pair further comprises:
   at least one elastic portion connected to the inner fixing portion;
   wherein the elastic portion and the inner fixing portion do not overlap along a radial direction perpendicular to an optical axis.

15. The camera module of claim 11, wherein each of the metal plates further comprises a notch structure for receiving the coil element.

16. The camera module of claim 11, wherein an air gap is formed between the plastic barrel and the metal plate pair.

* * * * *